United States Patent [19]

Wickberg

[11] 4,358,221

[45] Nov. 9, 1982

[54] SYSTEM FOR POLLUTION CONTROL

[76] Inventor: Norman E. Wickberg, 27 Wardell Cir., Oceanport, N.J. 07757

[21] Appl. No.: 226,111

[22] Filed: Jan. 19, 1981

[51] Int. Cl.³ .......................... C02F 11/12; C02F 1/00
[52] U.S. Cl. .................................... 405/128; 405/36; 405/51
[58] Field of Search ................... 405/128, 129, 52, 53, 405/54, 51, 36, 267, 266; 210/170

[56] References Cited

U.S. PATENT DOCUMENTS

| | | | |
|---|---|---|---|
| 1,159,055 | 11/1915 | Lowe | 405/55 X |
| 1,760,314 | 5/1930 | Murrey | 405/51 |
| 2,164,536 | 7/1939 | McCarthy | 405/129 |
| 3,705,851 | 12/1972 | Brauer | 405/129 X |
| 3,736,754 | 6/1973 | Azalbert et al. | 405/53 |
| 4,016,073 | 4/1977 | Jordan | 405/129 X |
| 4,252,462 | 2/1981 | Klingle et al. | 405/129 |

Primary Examiner—Dennis L. Taylor
Attorney, Agent, or Firm—Charles E. Temko

[57] ABSTRACT

The disclosure relates to dump sites for chemical and toxic wastes which avoid the usual problems of chemical pollution of ground water, streams and rivers. Use is made of impacted reinforced concrete tongue and groove sections in sealed relation to the upper surface of a naturally occurring aquaclude which define an enclosed area. Within the enclosed area there are provided a plurality of vertically positioned columns of sand which serve as wicks for collecting liquids. The wicks communicate at the upper ends thereof with gravel windrows leading to a collection pit from which liquids are pumped off for refining and/or recirculation to a chemical plant.

2 Claims, 2 Drawing Figures

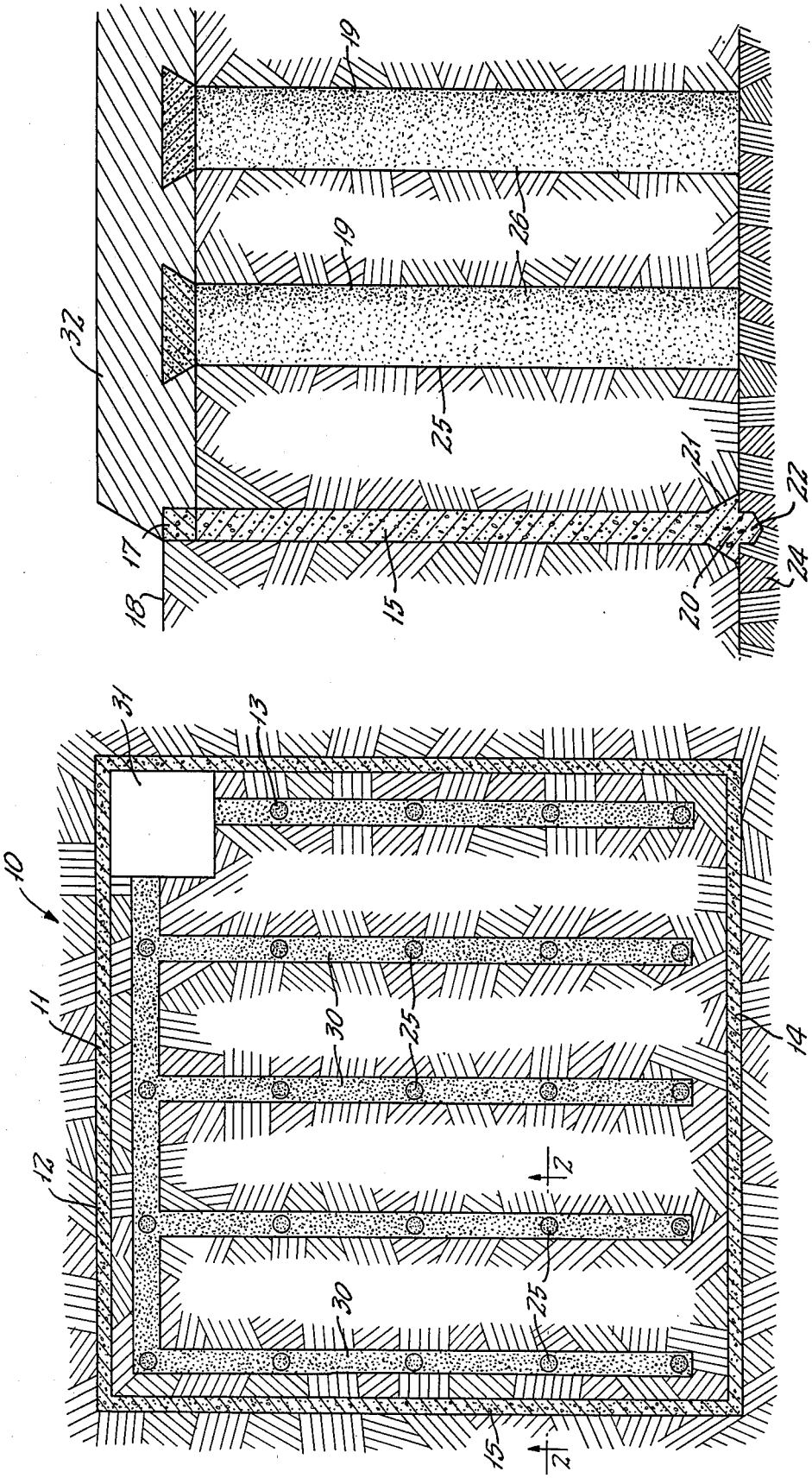

SYSTEM FOR POLLUTION CONTROL

BACKGROUND OF THE INVENTION

This invention relates generally to the field of industrial waste disposal, and more particularly to an improved dump site construction and method for constructing the same.

The problem of adequate disposal of toxic industrial wastes has been exhaustively treated in the literature. Unlike as in prior eras, it is no longer possible to dump such wastes into conveniently located streams or bodies of water, and most communities have barely adequate facilities to dispose of normal sewage.

It is known in the art to store such wastes in steel drums, either lined or otherwise, which are buried. Such disposal is very costly, and, more importantly, it is not permanent.

It is also known to isolate areas of land by providing an impervious barrier which extends vertically into the earth to a water impermiable layer of clay or similar material, commonly referred to as an aquaclude. The enclosed area in time becomes filled, and new sites must be periodically constructed.

A recent development is the source chemical landfill, in which a barrier is constructed to provide a sloping bottom surface leading to a leachate basin. A dam defines an area in which solid waste layers are maintained above the sloping bottom. Internal drains feed a drain pipe network leading to the leachate basin from which the leachate is pumped or siphoned to a water treatment unit. The sloping bottom of the landfill must be constructed as a part of the project, since most natural aquacludes lie in a plane parallel to the natural topography, and considerable storage space for solids is wasted by the presence of the leachate basin at the lower level of the landfill.

SUMMARY OF THE INVENTION

Briefly stated, the invention contemplates the provision of an improved dump site construction for toxic and similar wastes, and a method for constructing the same. The dump site makes use of naturally aquacludes and provides for the enclosure of specific retention areas by initially driven reinforced concrete tongue and groove sections sealed into the aquaclude. Within the retention area, vertical bores are made and filled with columns of sand which serve as wicks bringing the leachate to the normal grade level, where communication is made to gravel windrows leading to a collection pit at the upper level of the enclosed area at or near grade level, from which collected liquid may be pumped off. As continued waste is collected in an overburden, underlying layers of silt and sledge are compressed, forcing liquid up the sand wicks for collection. As the silt and sledge are compacted, they further seal the aquaclude.

BRIEF DESCRIPTION OF THE DRAWING

In the drawing, to which reference will be made in the specification, similar reference characters have been employed to designate corresponding parts throughout the several views.

FIG. 1 is a top plan view showing an embodiment of the invention.

FIG. 2 is a fragmentary vertical sectional view as seen from the plane 2—2 in FIG. 1.

DETAILED DESCRIPTION OF THE DISCLOSED EMBODIMENT

With reference to the drawing, the system includes a dump site, generally indicated by reference character 10 in which an enclosed area 11 is bordered by a plurality of interconnecting vertical walls 12, 13, 14 and 15, which are installed using a method hereinafter described. An optional to cap 17 may be used to bring the level of the walls to existing grade 18.

As seen in FIG. 2, the wall includes a plurality of pillars 19, each having a lower end 20 which is belled out at 21, and having a projecting tip 22 which penetrates an existing aquaclude 24 or other impervious strata.

Within the enclosed area, a plurality of bores, approximately two and one half feet in diameter and designated by reference character 25 are drilled, using an auger, the bores being subsequently filled with washed sand at 26. The bores extend from approximate grade level to the aquaclude.

Following this, a plurality of gravel filled windrows 30 are positioned to form a network as seen in FIG. 1, which network communicates with a collection pit 31, preferably at one corner of the enclosed area.

With continued disposal, an overburden 32 comprising solid waste layers will accumulate covering the windrows. During continued dumping, the liquid wastes will settle into the soil, and the added weight of the overburden will force the liquid component of the waste to the sand wicks, from whence pressure will force the liquids to the windrows for subsequent flow to the collection pit from whence the liquids are pumped for further treatment and/or recycling to a chemical plant (not shown).

With the foregoing in mind, consideration can now be made of the details of construction procedure. The walls 12-15, inclusive, as has been mentioned, include impacted concrete foundations. These are formed at the time each tongue and groove section is driven into the ground using a Diesel hammer, vibrator or auger, depending upon soil conditions. The appropriate tool drives a hollow pile having a rigid core which is first driven to proper tip elevation.

When this point has been reached, the hammer and the core are simultaneously raised leaving the hollow pile or casing in the soil. Next, approximately three to nine cubic feet of low slup concrete is pored into the casing, following which the hammer and core are lowered to impact the concrete at the lower end of the casing. During the impacting operation, the casing is partially withdrawn to form a bulb at the lower tip of the pile, and following this the hammer and core are raised to full out position.

Next a reinforcing cage is placed within the casing, and additional concrete is poured to the top of the casing. As a final step, the hammer and core are again lowered to maintain the concrete in place while the casing is fully withdrawn.

This process is continued using additional pile formations until the enclosed area is completely sealed, following which the optional top cap is postioned and cured.

I wish it to be understood that I do not consider the invention limited to the precise details shown and set forth in this specification, for obvious modifications will occur to those skilled in the art to which the invention pertains.

I claim:

1. An improved dump site for chemical and toxic wastes formed in an area having a natural aquaclude substantially parallel to the existing grade thereof comprising: a vertical impacted concrete cutoff wall extending from said grade to said aquaclude to define a liquid impermiable enclosure, a plurality of vertical bores extending into the area enclosed by said wall and extending substantially between grade level and said aquaclude, a quantity of sand filling said bores and forming a liquid wick; a plurality of gravel filled windrows communicating with said wicks to form a drainage network, and a collection pit communicating with said drainage network; whereby, upon the placing of waste slurries within said area, leachate will collect in said wicks to rise to said windrows and flow to said collection pit for removal.

2. The method for constructing a dump site for chemical and toxic wastes comprising the steps of:

(a) selecting a substantially level ground area to be enclosed, said area having a naturally occurring aquaclude substantially parallel to grade level;

(b) enclosing said area by forming an impacted concrete cutoff wall extending between grade level and said aquaclude;

(c) providing at periodic intervals within the area enclosed by said cutoff wall a plurality of vertical bores extending between grade and said aquaclude and filling said bores with sand to form liquid conducting wicks;

(d) providing at the upper ends of said wicks a network of gravel-filled windrows interconnecting said wicks; and (e) providing a liquid collection pit communicating with said windrows;

whereby liquid leachate may travel from said slurry to said wicks to rise to the level of said windrows and be conducted to said collection pit.

* * * * *